United States Patent
Chu et al.

(10) Patent No.: US 10,445,137 B2
(45) Date of Patent: Oct. 15, 2019

(54) COMPUTATIONAL RESOURCE ALLOCATION

(71) Applicant: Ab Initio Technology LLC, Lexington, MA (US)

(72) Inventors: Jacky Cheuk Kei Chu, Brighton, MA (US); Stephen J. Schmidt, Medford, MA (US); Bo Wang, Acton, MA (US)

(73) Assignee: Ab Initio Technology LLC, Lexington, MA (US)

( * ) Notice: Subject to any disclaimer, the term of this patent is extended or adjusted under 35 U.S.C. 154(b) by 126 days.

(21) Appl. No.: 15/833,213

(22) Filed: Dec. 6, 2017

(65) Prior Publication Data

US 2018/0165129 A1 Jun. 14, 2018

Related U.S. Application Data

(60) Provisional application No. 62/431,505, filed on Dec. 8, 2016.

(51) Int. Cl.
*G06F 9/48* (2006.01)
*G06F 9/50* (2006.01)

(52) U.S. Cl.
CPC .............. *G06F 9/4881* (2013.01); *G06F 9/48* (2013.01); *G06F 9/485* (2013.01); *G06F 9/4806* (2013.01);
(Continued)

(58) Field of Classification Search
CPC ........ G06F 9/48; G06F 9/4806; G06F 9/4843; G06F 9/4881; G06F 9/50; G06F 9/5005;
(Continued)

(56) References Cited

U.S. PATENT DOCUMENTS 7,051,188 B1  5/2006 Kubala et al.
8,565,407 B1 * 10/2013 Chou ................ H04M 3/5183
                                              379/221.01
(Continued)

OTHER PUBLICATIONS

Vinod Kumar Vavilapalli, Arun C. Murthy, Chris Douglas, Sharad Agarwal, Mahadev Konar, Robert Evans, Thomas Graves, Jason Lowe, Hitesh Shah, Siddharth Seth, Bikas Saha, Carlo Curino, Owen O'Malley, Sanjay Radia, Benjamin Reed, and Eric Baldeschwieler. 2013. Apache Hadoop YARN: yet another resource negotiator. In Proceedings of the 4th annual Symposium on Cloud Computing (SOCC '13). ACM, New York, NY, USA, , Article 5 , 16 pages.

(Continued)

*Primary Examiner* — Charles M Swift
(74) *Attorney, Agent, or Firm* — Occhiuti & Rohlicek LLP

(57) ABSTRACT

Requesting computational resources for executing a program including a number of program portions includes computing sets of requests. Each set, except an initial set, is processed by a computational resource manager only if the previously submitted sets were granted. One or more additional sets are formed for processing by the manager after the initial set. A request of the additional sets includes a partial request for a program portion that is in a least-fulfilled set of program portions. Each program portion is associated with a respective fulfillment ratio of its quantity of previously requested resources divided by an associated target quantity. The partial request requests a quantity of resources that is small enough so that, after the partial request is granted, each program portion in the least-fulfilled set will have a fulfillment ratio that is greater than its fulfillment ratio had been, and is still smaller than one.

20 Claims, 15 Drawing Sheets

(52) U.S. Cl.
CPC .............. *G06F 9/4843* (2013.01); *G06F 9/50* (2013.01); *G06F 9/505* (2013.01); *G06F 9/5005* (2013.01); *G06F 9/5027* (2013.01); *G06F 9/5038* (2013.01); *G06F 9/5061* (2013.01); *G06F 9/5077* (2013.01); *G06F 9/5083* (2013.01); *G06F 2209/5013* (2013.01)

(58) Field of Classification Search
CPC ...... G06F 9/5027; G06F 9/5038; G06F 9/505; G06F 9/5061; G06F 9/5083
See application file for complete search history.

(56) References Cited

U.S. PATENT DOCUMENTS

| | | | |
|---|---|---|---|
| 9,436,508 B1 * | 9/2016 | Theimer | G06F 9/45558 |
| 9,727,379 B1 * | 8/2017 | Wilkes | G06F 9/5038 |
| 2003/0236854 A1 * | 12/2003 | Rom | H04L 47/15 |
| | | | 709/217 |
| 2005/0210262 A1 | 9/2005 | Rolia et al. | |
| 2006/0277307 A1 | 12/2006 | Bernardin et al. | |
| 2012/0167112 A1 | 6/2012 | Harris et al. | |
| 2014/0245298 A1 | 8/2014 | Zhou et al. | |
| 2015/0120928 A1 | 4/2015 | Gummaraju et al. | |
| 2017/0220944 A1 | 8/2017 | Nghiem | |
| 2019/0021032 A1 * | 1/2019 | Bergstrom | H04W 72/1284 |

OTHER PUBLICATIONS

Robert Grandl, Ganesh Ananthanarayanan, Srikanth Kandula, Sriram Rao, and Aditya Akella. 2014. Multi-resource packing for cluster schedulers. SIGCOMM Comput. Commun. Rev. 44, 4 (Aug. 2014), pp. 455-466.

* cited by examiner

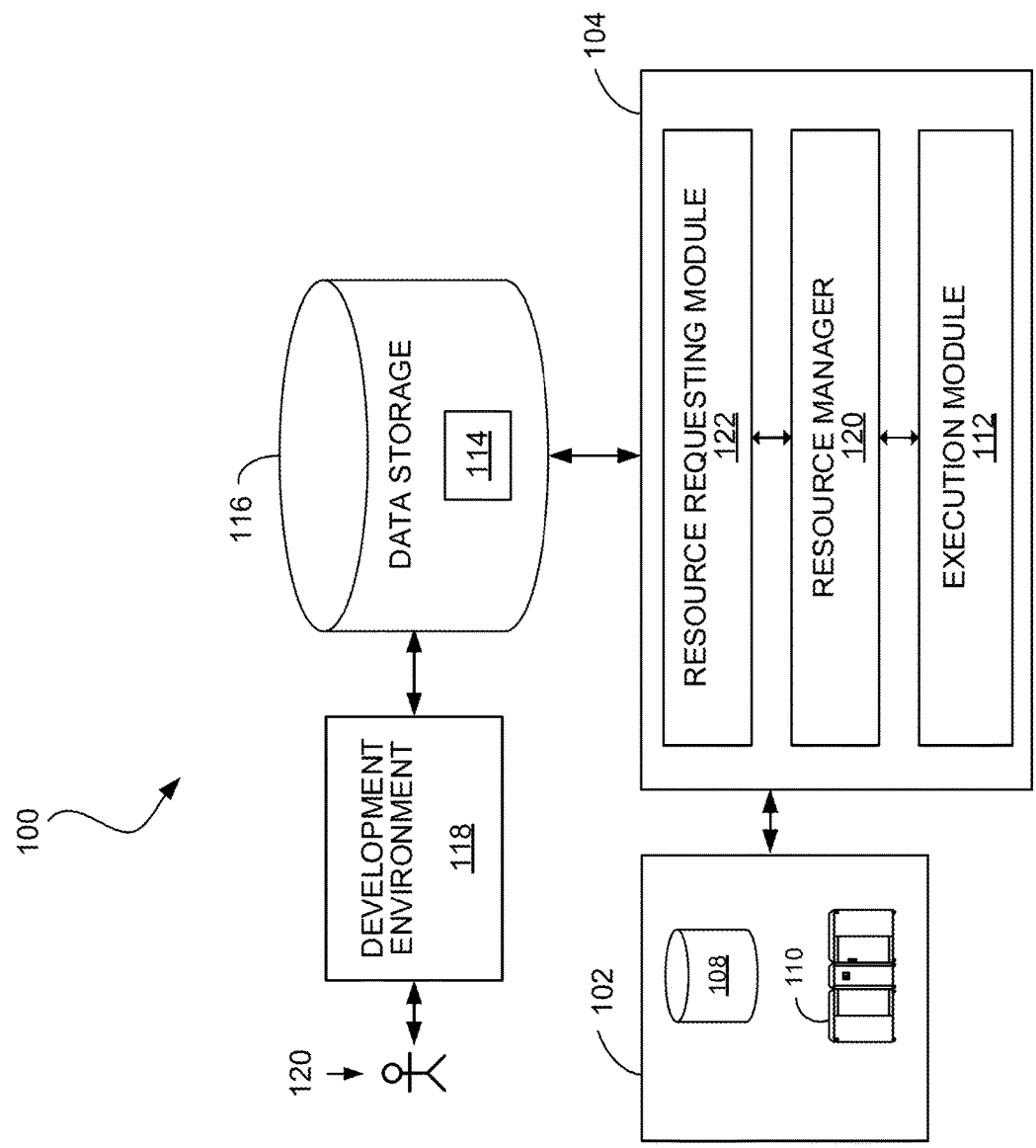

COMPUTATIONAL RESOURCE ALLOCATION

CROSS-REFERENCE TO RELATED APPLICATIONS

This application claims priority to U.S. application Ser. No. 62/431,505, filed on Dec. 8, 2016, which is incorporated herein by reference.

BACKGROUND

This description relates to resource allocation in a computing system.

Applications that run on computing systems require a portion of the computing system's computational resources to do so. The computing system must therefore manage allocation of its resources to applications running thereon. Some examples of resources that are allocated to applications include access to a portion of the computing system's memory, access to file data, and access to a required amount of processing power.

In distributed computing systems, computational resources (including data storage and processing resources) are distributed among a number of servers included in one or more clusters that work together to run data processing applications. In some examples, distributed computing systems use a centralized resource manager, which both schedules execution of applications on the computing system and manages allocation of the computing system's distributed resources to the applications. One such resource manager is "Hadoop YARN."

SUMMARY

In a general aspect, a method for requesting, from a computational resource manager, computational resources for executing a program in a computing system includes storing information specifying target quantities of computational resources associated with respective ones of a number of program portions of the program, where each program portion uses computational resources granted by the computational resource manager enabling that program portion to be executed in the computing system; and computing requests for submission to the computational resource manager as a number of sets of requests, where each set of requests, except for an initial set of requests, is processed by the computational resource manager only if the previously submitted one or more sets of the number of sets of requests were granted by the computational resource manager. The computing includes forming the initial set of requests, and forming one or more additional sets of requests for processing by the computational resource manager after the initial set of requests. At least one set of requests of the additional sets of requests includes a partial request for at least one program portion that is in a least-fulfilled set of one or more program portions. Each program portion is associated with a respective fulfillment ratio of its quantity of previously requested computational resources divided by its associated target quantity of computational resources. A program portion is a member of the least-fulfilled set if its associated fulfillment ratio, over all of the number of program portions, is the minimum of the associated fulfillment ratios. The partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

Aspects may include one or more of the following features.

The partial request may request a quantity of computational resources that is small enough so that, after the partial request is granted, each program portion in the least-fulfilled set will have a fulfillment ratio that is still smaller than a fulfillment ratio of at least one program portion outside of the least-fulfilled set. The partial request may request a quantity of computational resources that is large enough so that, after the partial request is granted, each program portion in the least-fulfilled set will have a fulfillment ratio that is at least as large as a fulfillment ratio of at least one program portion outside the least-fulfilled set.

The initial set of requests may include a minimum request for each program portion, where each minimum request requests a minimum quantity of computational resources needed to execute the corresponding portion of the program. At least one of the program portions may be associated with a fixed target quantity of computational resources and at least one of the program portions may be associated with a variable target quantity of computational resources, and the minimum request for each program portion associated with a fixed target quantity of computational resources may be a full request corresponding to the complete target quantity of computational resources, and the minimum request for each program portion associated with a variable target quantity of computational resources may be a partial request corresponding to less than the complete target quantity of computational resources.

The minimum request for each program portion associated with a variable target quantity of computational resources may be a partial request corresponding to a single unit of computational resources, where each variable target quantity of computational resources may be defined in terms of a granularity of computational resources that divides the complete target quantity of computational resources into a number of units of equal size. At least some requests in at least one set of requests may correspond to quantities of computational resources of different sizes from each other. Storing the information specifying target quantities of computational resources associated with respective ones of the number of program portions may include, for at least one program portion, determining its associated target quantity of computational resources based at least in part on user input.

The computational resources may be distributed over a number of computing nodes. At least some of the program portions may require that their granted computational resources are obtained from a specific one or more computing nodes of the number of computing nodes. Computational resources associated with each request of each set of requests of the number of sets of requests may be obtained from a single computing node of the number of computing nodes. At least some of the program portions may be configured to process data items from one or more data sources and the method further includes determining the target quantities of computational resources for each of the program portions based at least in part on the data items from the one or more data sources.

Determining the target quantities of computational resources for each of the program portions based at least in part on the data items from the one or more data sources may include, for each program portion, adding computational resources associated with a single instance of the program portion to the target quantity of computational resources associated with the program portion for each data item to be processed by the program portion. Each request, of each set of requests of the number of sets of requests, may request computational resources required by a single instance of a particular program portion of the number of program portions. A first program portion of the number of program portions may be associated with a number of requests from the number of sets of requests. The method may include receiving, in response to the initial set of requests, an indication that one or more requests of the initial set of requests was not fulfilled and aborting execution of the program based on the response.

In another general aspect, software stored in a non-transitory form on a computer-readable medium, for requesting, from a computational resource manager, computational resources for executing a program in a computing system include instructions for causing a computing system to store information specifying target quantities of computational resources associated with respective ones of a number of program portions of the program, where each program portion uses computational resources granted by the computational resource manager enabling that program portion to be executed in the computing system; and compute requests for submission to the computational resource manager as a number of sets of requests, where each set of requests, except for an initial set of requests, is processed by the computational resource manager only if the previously submitted one or more sets of the number of sets of requests were granted by the computational resource manager. The computing includes forming the initial set of requests, and forming one or more additional sets of requests for processing by the computational resource manager after the initial set of requests. At least one set of requests of the additional sets of requests includes a partial request for at least one program portion that is in a least-fulfilled set of one or more program portions. Each program portion is associated with a respective fulfillment ratio of its quantity of previously requested computational resources divided by its associated target quantity of computational resources. A program portion is a member of the least-fulfilled set if its associated fulfillment ratio, over all of the number of program portions, is the minimum of the associated fulfillment ratios. The partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

In another general aspect, a computing system for requesting, from a computational resource manager, computational resources for executing a program in the computing system includes a data storage system storing information specifying target quantities of computational resources associated with respective ones of a number of program portions of the program, where each program portion uses computational resources granted by the computational resource manager enabling that program portion to be executed in the computing system; and at least one processor configured to compute requests for submission to the computational resource manager as a number of sets of requests, where each set of requests, except for an initial set of requests, is processed by the computational resource manager only if the previously submitted one or more sets of the number of sets of requests were granted by the computational resource manager. The computing includes forming the initial set of requests, and forming one or more additional sets of requests for processing by the computational resource manager after the initial set of requests. At least one set of requests of the additional sets of requests includes a partial request for at least one program portion that is in a least-fulfilled set of one or more program portions. Each program portion is associated with a respective fulfillment ratio of its quantity of previously requested computational resources divided by its associated target quantity of computational resources. A program portion is a member of the least-fulfilled set if its associated fulfillment ratio, over all of the number of program portions, is the minimum of the associated fulfillment ratios. The partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

In another general aspect, a computing system for requesting, from a computational resource manager, computational resources for executing a program in the computing system includes means for storing information specifying target quantities of computational resources associated with respective ones of a number of program portions of the program, where each program portion uses computational resources granted by the computational resource manager enabling that program portion to be executed in the computing system; and means for computing requests for submission to the computational resource manager as a number of sets of requests, where each set of requests, except for an initial set of requests, is processed by the computational resource manager only if the previously submitted one or more sets of the number of sets of requests were granted by the computational resource manager. The computing includes forming the initial set of requests, and forming one or more additional sets of requests for processing by the computational resource manager after the initial set of requests. At least one set of requests of the additional sets of requests includes a partial request for at least one program portion that is in a least-fulfilled set of one or more program portions. Each program portion is associated with a respective fulfillment ratio of its quantity of previously requested computational resources divided by its associated target quantity of computational resources. A program portion is a member of the least-fulfilled set if its associated fulfillment ratio, over all of the number of program portions, is the minimum of the associated fulfillment ratios. The partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

Aspects can include one or more of the following advantages.

Among other advantages, aspects allocate computational resources to interdependent components of a data processing graph such that no one component is allocated more computational resources than it needs while another component is starved of computational resources. Thus, these techniques contribute to efficient usage of the computational resources of the computing system, and therefore increase the efficiency of the internal functioning of the computing system (e.g., to lower energy consumption). Another technical effect of the techniques described herein is the effect on the programs being executed on the computing system. For example, by facilitating balanced allocation of computational resources, a greater number of programs may be able to execute concurrently, and/or some of the programs may be able to start sooner by not having to wait as long to acquire the necessary computational resources needed to execute.

Other features and advantages of the invention will become apparent from the following description, and from the claims.

DESCRIPTION OF DRAWINGS

FIG. 1 is a block diagram of a system for allocation of distributed computational resources.

DESCRIPTION

Figure 2A:
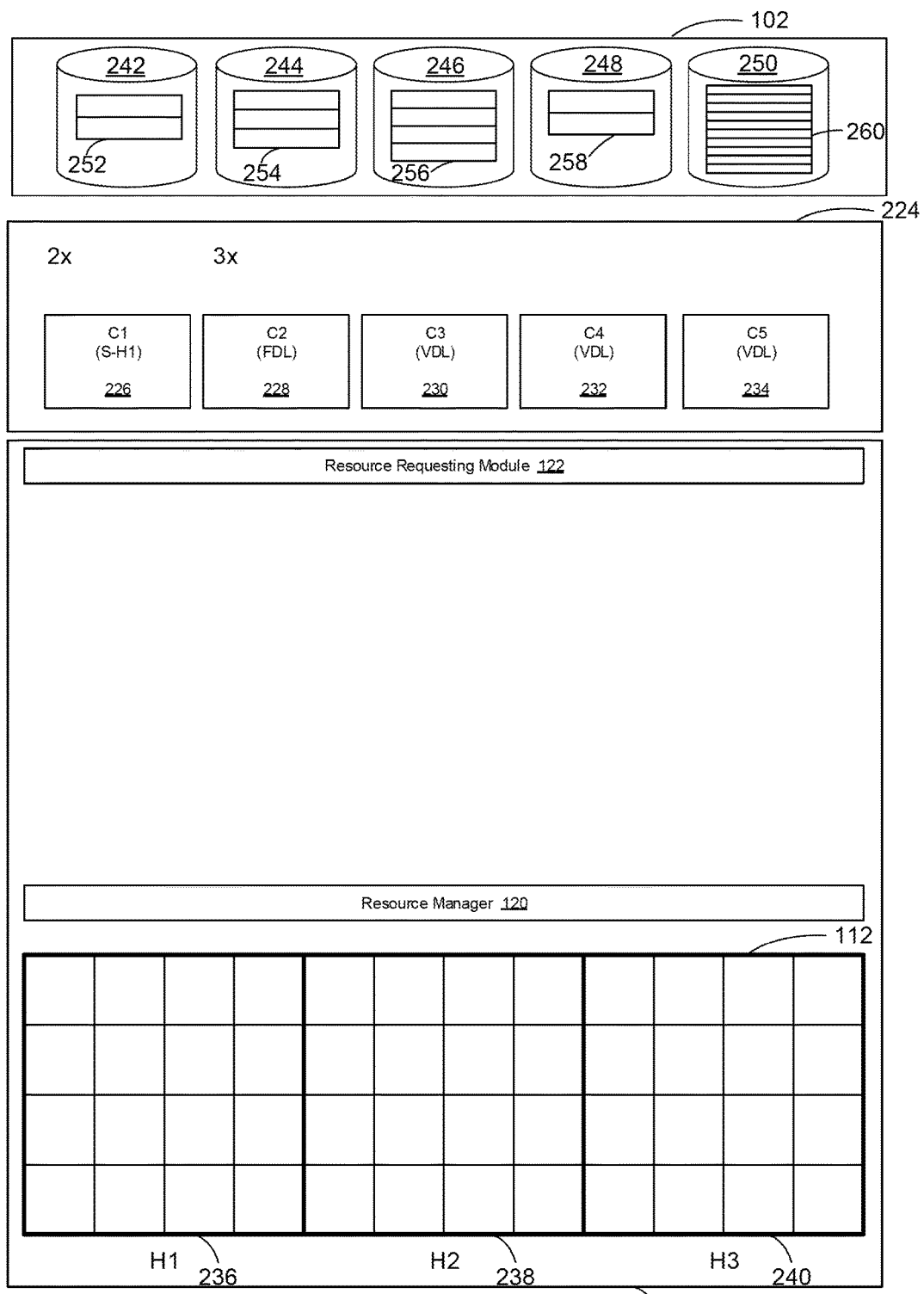
FIG. 2A is a detailed block diagram of the system for allocation of distributed computational resources.

FIG. 1 shows an example of a data processing system 100 in which the resource allocation techniques can be used. The system 100 includes a data source 102 that may include one or more sources of data such as storage devices or connections to online data streams, each of which may store or provide data in any of a variety of formats (e.g., database tables, spreadsheet files, flat text files, or a native format used by a mainframe). An execution environment 104 includes an execution module 112, a resource manager 120, and a resource requesting module 122. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MTV) systems, or remote, or remotely distributed (e.g., multiple processors coupled via a local area network (LAN) and/or wide-area network (WAN)), or any combination thereof.

A data storage system 116 is accessible to the execution environment 104 and to a development environment 118. The development environment 118 is a system for developing programs that can be configured in a variety of ways such that different interrelated program portions are associated with different target quantities of computational resources to be allocated for use at runtime. In some implementations, these programs are data processing programs that process data during runtime, such as data received from the data source 102. One example of a data processing program is a data processing graph that includes vertices (representing data processing components or datasets) connected by directed links (representing flows of work elements, i.e., data) between the vertices. In addition to these data flow connections, some data processing graphs also have control flow connections for determining flow of control among components. In such data processing graphs, the program portions are the components and they are interrelated according to their data flow links. In other examples, the program portions are sub-modules or other entities within a program that are separately granted computing resources for being executed. The program portions are considered interrelated to the extent that the ability of the overall program to which they belong to be executed depends on the abilities of the individual program portions. Such interrelated or interdependent program portions may also be dependent on each other for execution. For example, one program portion may receive data from or provide data to another program portion. Also, while the program portions are separately granted computing resources, they may overlap or be interdependent in various other ways (e.g., competing for a limited supply of computing resources).

For example, such an environment for developing graph-based computations is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. Data processing graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The execution module 112 processes data from the data source 102 according to one or more data processing graphs 114, using computational resources allocated by the resource manager 120, to generate output data which is stored back in the data source 102 or in the data storage system 116, or otherwise used. Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure). In some examples, the data source 102, includes different forms of database systems including data that may be organized as records having values for respective fields (also called "attributes" or "columns"), including possibly null values.

The resource manager 120 schedules execution of one or more computer programs, such as the data processing graphs 114, on the execution environment 104 and manages allocation of the execution environment's resources to the data processing graphs. As is described in greater detail below, for computer programs that include interrelated program portions, such as data processing graphs that include a number of interdependent components, the resource requesting module 122 interacts with the resource manager 120 to allocate computational resources to the components such that no one component is allocated more computational resources than it needs while another component is starved of computational resources.

Referring to FIG. 2A, an alternative representation of the data processing system 100 includes the execution environment 104, the data source 102, and a data processing graph 224 for processing data from the data source 102 using computational resources of the execution environment 104.

The execution environment 104 includes the resource requesting module 122, the resource manager 120, and the execution module 112. Among other features, the execution module 112 includes computational resources which may be distributed across multiple hosts (e.g., computing clusters such as servers). In FIG. 2A, there are three hosts: a first host H1 236, a second host, H2 238, and a third host, H3 240. Each host includes a finite amount of computational resources which taken together include the total computational resources of the execution module 112. Examples of the computational resources being managed and allocated by the resource manager 120 may include any of: a usage share of a host's processor (e.g., specified as virtual cores that map to physical cores of one or more multi-core processors), a portion of volatile memory of a host (e.g., specified a quantity of the host's main memory space), a portion of non-volatile memory of a host (e.g., specified as a quantity of the host's hard disk drive storage space), or a usage share of a communication channel (e.g., a fraction of the bandwidth of a host's Ethernet interface). A single unit of computational resources may include multiple types of resources, such as a specified number of CPUs or virtual cores and a specified amount of main memory.

In FIG. 2A, for the sake of simplifying the explanation of the computational resource allocation approaches described herein, the computational resources of the hosts are represented as computational resource units (illustrated as squares within the hosts), which are all shown as having the same granularity (i.e., the smallest size that can be granted). However, it is noted that the computational resources are not necessarily segmented into units with a fixed and equal granularity but can instead be segmented into units of various granularities or portioned using other, alternative approaches. Furthermore, for the sake of simplifying the explanation of the computational resource allocation approaches described herein, all of the hosts in the execution module 112 of FIG. 2A are shown as having the same number (i.e., 16) of computational resource units. However, it is noted that, in general, different hosts may have different amounts of computational resources.

The resource manager 120 receives requests for computational resources and either grants or denies the requests based on an amount of available computational resources in the hosts of the execution module 112. One example of such a resource manager 120 includes the "Hadoop YARN" resource manager which is capable of receiving a request for computational resources for executing a computer program (or program portion) and, if sufficient computational resources are available, grants a 'container' with some number of units of the computational resources for use by the program, where a container can be implemented as any suitable data structure for containing a particular quantity of computational resources, or containing any information that identifies a particular quantity of computational resources, or any combination thereof. The computer program may then execute using the computational resources in the granted container. In some examples, the computer program can request multiple containers of resources at one time (e.g., a number of containers for running concurrent instances of a portion of the program) from the resource manager 120. If sufficient resources are available for the resource manager 120 to grant all of the requested multiple containers to the computer program, it will do so. Otherwise, based on the available resources, the resource manager 120 may grant only some of the requested containers (i.e., an integer number of containers less than the total number of containers requested), or the resource manager 120 may not grant any of the requested containers. In some implementations, all of the computational resources associated with a given container are derived from a single host. Alternatively, in other implementations, a given container's resources may be derived from multiple hosts.

As is described in greater detail below, the resource requesting module 122 interacts with the resource manager 120 in a way that ensures that a number of constraints imposed by the data processing graph 224 are satisfied, and/or are satisfied in a more balanced manner.

Figure 2B:
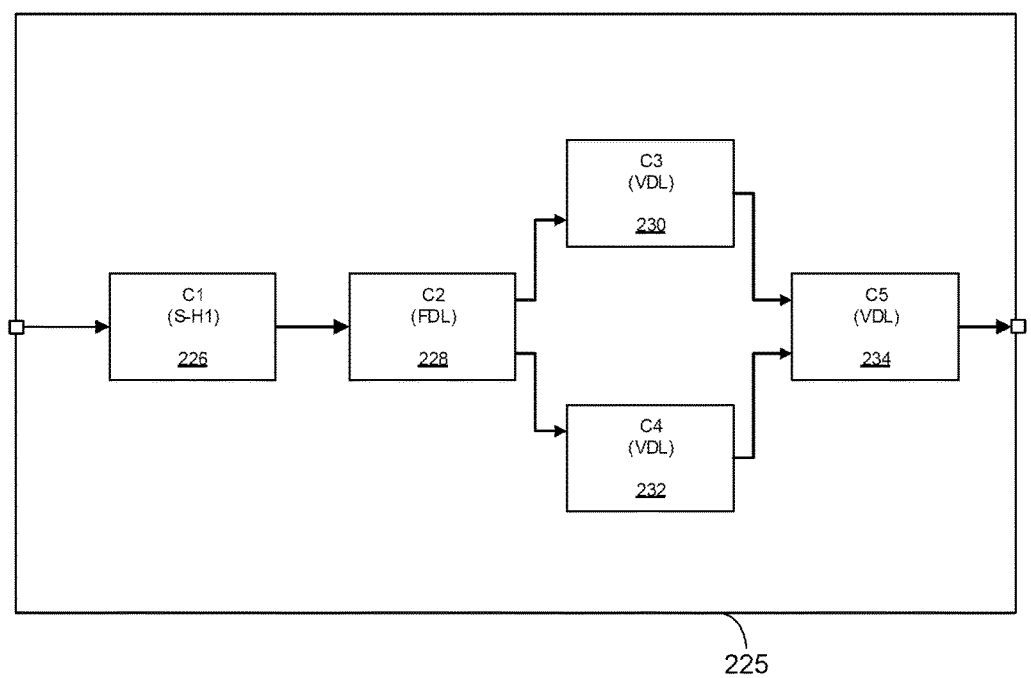
FIG. 2B is diagram of an example of a data processing graph.

The data processing graph 224 is a specification of a computer program for processing data received from the data source 102. FIG. 2B shows an example of a graph-based specification 225 of the data processing graph 224, which includes a number of interrelated components including a first component, C1 226, a second component, C2 228, a third component, C3 230, a fourth component, C4 232, and a fifth component, C5 234.

In general, each component of a data processing graph may be associated with one or more constraints. Such constraints may be provided by a 'layout' that specifies constraints related to parallelization of the component. One of the constraints specified in the layout is a 'layout type' which can take one of a number of values including a static (S) layout type, a fixed-depth dynamic layout (FDL) type, and a variable-depth dynamic layout (VDL) type. The different layout types specify constraints related to the number of instances of a component that are to execute in parallel when the component is executed. Each of these component instances will consume computational resources, so the target quantity of computational resources needed for a component with a particular layout is directly determined by the corresponding target number of component instances for that component.

Very generally, a component with a static layout type has a predefined, fixed target number of component instances that are required to execute on the execution module 112 for the data processing graph 224 to successfully run. A component with a static layout type is also required to execute its component instances on a predefined set of one or more hosts of the execution module 112.

A potential advantage of the static layout type is locality of the computation. Locality refers to the ability to locate certain computational resources for the component (e.g., a core of a host on which an instance will execute) on the same host as other computational resources (e.g., memory of the host in which data for the instance is stored). A dynamic layout type (FDL or VDL) may assign an instance to execute on a different host from the host that stores data to be operated on by that instance, which may provide increased flexibility, but only by trading off reduced locality. Though, if locality is not critical to a particular computation, this trade-off may be worthwhile.

A component with an FDL type has a predefined, fixed target number of component instances that are required to execute on the execution module 112 for the data processing graph 224 to successfully run. There is no restriction as to where (i.e., on which hosts of the execution module 112) the component instances of a component with an FDL type execute.

A component with a VDL type has a dynamically determined target number of component instances (which may be determined at runtime), where execution of at least one component instance on the execution module 112 is required for the data processing graph 224 to run. There is no restriction as to where (i.e., on which hosts of the execution module 112) the instances of a component with a VDL type execute.

A potential advantage of the dynamic layout type (FDL or VDL) is the flexibility of a computation being able to start even if there are no computational resources available on a particular (e.g., local) host, as long as there are computational resources available on some host in a cluster. Another potential advantage is, if a computation fails due to failure of one or more hosts, the computation may be able to restart on a different set of hosts.

A potential advantage of the VDL type over the FDL type is, even if there is not a high enough quantity of computational resources as desired, the computation is still able to start. A potential advantage of the FDL type over the VDL type is the ability to fix the degree of parallelism (i.e., number of instances) in order to limit the startup time delay that would be incurred by waiting for requests for a larger degree of parallelism to be fulfilled.

In the exemplary data processing graph 224 of FIGS. 2A and 2B, the first component 226 has a static layout type and is required to execute two component instances on the first host 236 of the execution module 112. The second component 228 has an FDL type and is required to run three component instances on the execution module 112 with no restriction as to where (i.e., on which hosts of the execution module 112) the component instances are run. The third component 230, the fourth component 232, and the fifth component 234 all have VDL types and therefore are only required to execute a single component instance on the execution module 112 for the data processing graph to execute, though additional component instances may be executed if sufficient computational resources are available on the execution module 112. There is no restriction as to where (i.e., on which hosts of the execution module 112) the component instances of the third component 230, the fourth component 232, and the fifth component 234 execute.

Each of the components in the data processing graph 224 is configured to process data elements (e.g., blocks, files, or records) from datasets in the data source 102. In some examples, a block is a portion of data in a file that includes one or more records. In FIG. 2A, the first component 226 processes first data elements 252 from a first dataset 242, the second component, C2 228 processes second data elements 254 from a second dataset 244, the third component, C3 230 processes third data elements 256 from a third dataset 246, the fourth component, C4 232 processes fourth data elements 258 from a fourth dataset 248, and the fifth component, C5 234 processes fifth data elements 260 from a fifth dataset 250. In an example described below, a portion of the system 100 (e.g., the resource requesting module 122) analyzes the datasets associated with each component to determine a target number of instances for different components, and consequently a target quantity of computational resources, based on the number of data elements. But, in other examples, the target quantity of computational resources is not solely based on a quantity of data in an associated dataset, but may instead (or also) depend on other factors, such as explicit or implicit user requirements, historical or estimated performance data, or combinations thereof. It is noted that there is no requirement that each component is associated with a different dataset. For example, a number of components may all process data from one or more of the same dataset(s).

1 RESOURCE ALLOCATION

Given the layout constraints associated with the components in the data processing graph 224, the data processing graph 224 can only successfully run if two instances of the first component 226 are executed on the first host 236 of the execution module 112, three instances of the second component 228 are executed on the execution module 112, and at least one instance of each of the third component 230, the fourth component 232, and the fifth component 234 are executed on the execution module 112.

If the resource requesting module 122 has knowledge of the resources required by a total number of instances of the components of the data processing graph 224 and the resources available in the execution module 112, then the task of allocating the computational resources for the data processing graph 224 via the resource manager 120 could be performed using a solution to a packing optimization problem.

However, it is generally not the case that resource requesting module 122 has knowledge of the resources available in the execution module 112. Instead, the resource requesting module 122 simply requests resources from the resource manager 120 and waits to see if the requested resources are granted. Due to the lack of knowledge of the resources available in the execution module 112, there is a potential that the resource requesting module 122 will over-allocate the resource requirements of certain VDL type components of the data processing graph 224 and in doing so, exhaust the computational resources available in the execution module 112 before any computational resources are allocated to other VDL type components of the data processing graph 224 (i.e., starvation), or waste computational resources of over-allocated components by creating a bottleneck with under-allocated components (i.e., unbalanced execution).

1.1 COMPUTATIONAL RESOURCE STARVATION

For example, in one approach to allocating computational resources for the data processing graph 224, the resource requesting module 122 first requests the computing resources required for the first, static layout type component 226 and the second, FDL type component 228. In this example, the resource manager 120 is able to allocate the required computational resources for the first component 226 and the second component 228.

The resource requesting module 122 then requests computational resources for executing the target number of instances (4 instances) of the third, VDL component 230 on the execution module 112 (rather than only requesting enough computational resources to execute the required, single instance of the third component 230 on the execution module 112). The resource manager 120 is able to allocate the requested computational resources for the 4 instances of the third component 230. Next, the resource requesting module 122 requests the computational resources required to execute a single instance of the fourth component 232. In this example, the resource manager 120 indicates that there are insufficient resources for allocating the computational resources required to execute a single instance of the fourth component 232 on the execution module 112.

In the above example, by over-allocating the optional target computational resources for the third component 230, the resource requesting module 122 has essentially starved the fourth component 232 and the fifth component 234 of the data processing graph 224 of any computational resources. As a result, the fourth component 232 and the fifth component 234 are unable to execute even a single instance on the execution module 112. Since the data processing graph 224 requires execution of at least one instance of all of its VDL type components on the computing system 112 to successfully run, the data processing graph is unable to successfully run. Whereas, if the third component 230 were only allocated computational resources for a single instance, there would have been enough for a single instance of each of the fourth component 232 and fifth component 234. In this sense the third component 230 was over-allocated computational resources.

1.2 COMPUTATIONAL RESOURCE REQUESTING ALGORITHM

Figure 3:
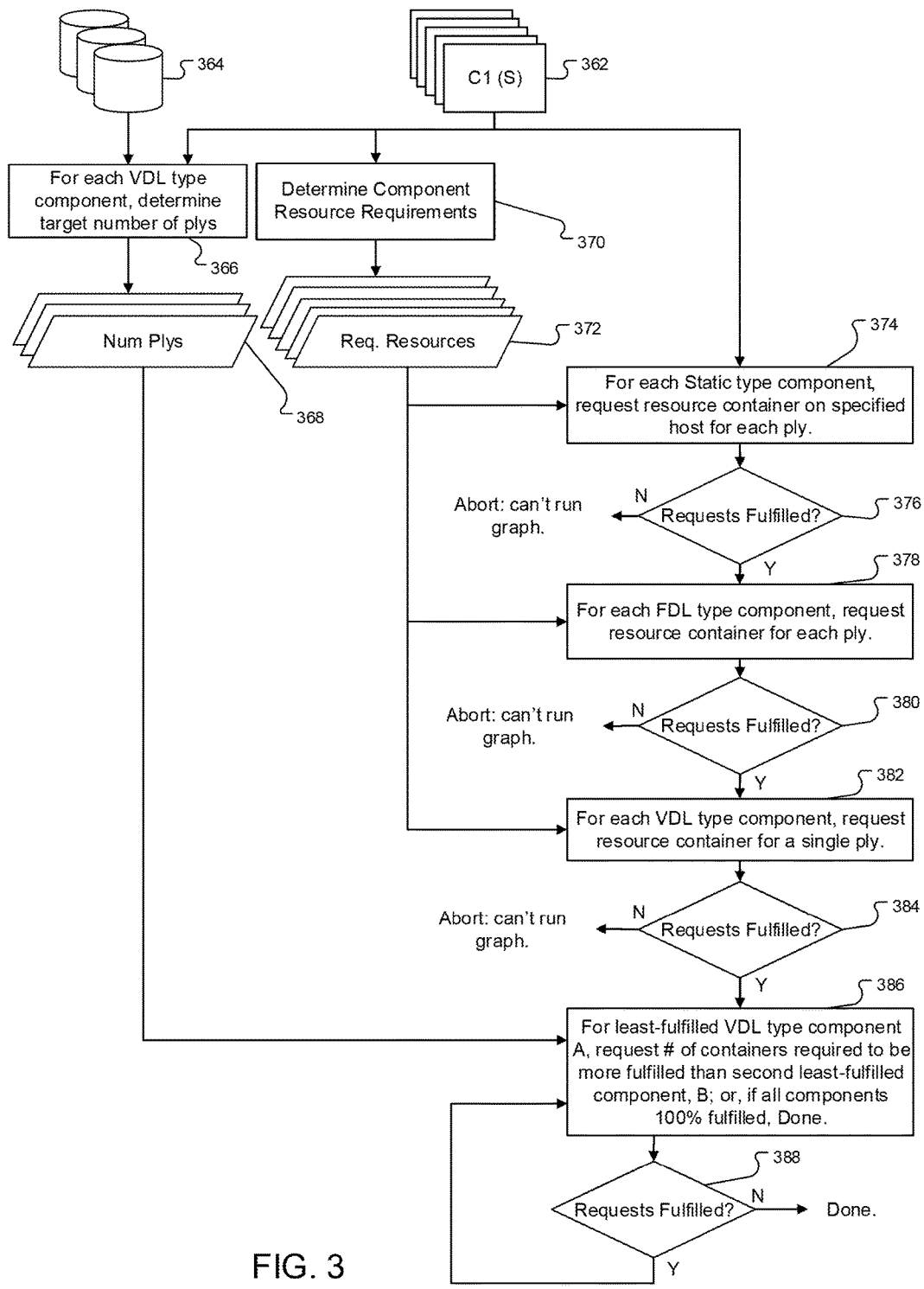
FIG. 3 is a flowchart of a distributed computational resource allocation algorithm.

Referring to FIG. 3, a resource requesting algorithm implemented by the resource requesting module 122 avoids the above-described starvation of components, and fairly allocates computational resources to VDL type components in a balanced manner. The algorithm accepts the components 362 of the data processing graph 224 and the datasets 364 from the data source 102 as input and processes the input to allocate computational resources to the components 362 for processing data from the datasets 364, including fairly allocating computational resources to VDL type components and avoiding starving VDL type components of computational resources. One or more pre-processing steps may optionally be included in the algorithm, such as identifying (e.g., based on metadata associated with each of the data processing components) any static, FDL and VDL data processing components in the accepted data processing components 362 of the data processing graph 224.

In a first step 370, each of the components 362 is analyzed to determine an amount of computational resources 372 required to execute an instance of the component on the execution module 112. In a second step 366, for each VDL type component, the number of data items of the dataset(s) associated with the component is used to determine a target number of instances 368 (sometimes referred to as 'plys') associated with the component. In some examples, the target number of instances 368 is the same as the number of data items of the datasets(s) associated with the component.

In a third step 374, for each required instance of each static layout type component, the resource requesting module 122 requests a 'container' including the required computational resources from the required host(s) for the instance from the resource manager 120. If the requests are successful (i.e., the resource manager is able to fulfill the requests), the resource manager 120 responds to each of the requests with a container including the required computational resources. At a fourth step 376, if any of the requests sent to the resource manager 120 in the third step 374 are not fulfilled (e.g., if the resource manager 120 does not respond within a predetermined time interval), the algorithm aborts because there are insufficient resources available in the execution module 112 for executing the data processing graph 224. If all of the requests sent to the resource manager 120 in the third step 374 are fulfilled, the algorithm proceeds to a fifth step 378.

In the fifth step 378, for each required instance of each FDL type component, the resource requesting module 122 requests a container including the required computational resources for the instance from the resource manager 120. As is noted above, FDL type components can execute using resources from any of the hosts of the execution module 112. In a sixth step 380, if any of the requests sent to the resource manager 120 in the fifth step 378 are not fulfilled, the algorithm aborts because there are insufficient resources available in the execution module 112 for executing the data processing graph 224. If all of the requests sent to the resource manager 120 in the fifth step 378 are fulfilled, the algorithm proceeds to a seventh step 382.

In the seventh step 382, for each VDL type component, the resource requesting module 122 requests a container including the required computational resources for a single instance of the component from the resource manager 120. In an eighth step 384 if any of the requests sent to the resource manager 120 in the seventh step 382 are not fulfilled, the algorithm aborts because there are insufficient resources available in the execution module 112 for executing the data processing graph 224. If all of the requests sent to the resource manager 120 in the seventh step 382 are fulfilled, sufficient computational resources are allocated to ensure that the data processing graph 224 can execute. In particular, upon successful completion of the seventh step 382, the algorithm has ensured that the required computational resources for any static layout type components and FDL type components are allocated, and that at least some computational resources are allocated to each of the VDL type components. The algorithm then proceeds to a ninth step 386.

In the ninth step 386, all of the VDL type components are ranked according to their fulfillment ratio, where the term 'fulfillment ratio' relates to a percentage of the component's target computational resources that have been allocated to the component. In particular, the fulfillment ratio is the quantity of previously requested (and assumed granted) computational resources '# granted' divided by its associated target quantity of computational resources '# target'. For example, if a VDL type component has a target set to run ten instances of itself, and has had two instances previously requested (and granted), that component is twenty percent fulfilled. Note that, in this example, each instance of a particular component is assumed to require the same quantity of computational resources (specified as a number of containers), but in other examples, different instances of the same component may require different quantities of computational resources. The number of containers granted then determines the number of component instances that can be executed at runtime.

Once the VDL type components are ranked according to their fulfillment ratios, the least-fulfilled VDL type component (referred to as component A) and the second least-fulfilled component (referred to as component B) are identified. For a tie in identifying the least-fulfilled component, the following can be performed for each of the least-fulfilled components. A tie in identifying the second least-fulfilled component does not matter, since only its fulfillment ratio will be used. For the least-fulfilled component, the resource requesting module 122 requests a number, N, of containers for the least-fulfilled component such that, if granted, that 'partial request' would result in the least-fulfilled component being more fulfilled than the second least-fulfilled component. In some examples, N is determined according to the following equation:

$$N = \left\lfloor \left( \frac{\# \text{ granted to } B}{\# \text{ target for } B} - \frac{\# \text{ granted to } A}{\# \text{ target for } A} \right) * (\# \text{ target for } A) + 1 \right\rfloor$$

If a tie occurs because all components are completely fulfilled (i.e., fulfillment ratio of 1), then the algorithm is complete.

In a tenth step 388, if any of the containers requested by the resource manager 120 in the ninth step 386 are not fulfilled, the algorithm is complete. If all of the containers requested by the resource manager 120 in the ninth step 386 are fulfilled, the algorithm loops back to the ninth step 386. The ninth step 386 and the tenth step 388 repeatedly run until all of the components are completely fulfilled (i.e., have a fulfillment ratio of 100%), or a request for containers for any of the VDL type components is not fulfilled.

In other exemplary implementations, some of the steps of the resource requesting algorithm can be performed in a different order or some steps can be eliminated. For example, requests of steps 374, 378, and 382 can be performed in a different order, or combined into a single request.

In some exemplary implementations, the algorithm above formulates all of the requests for containers before any of the requests are submitted to the resource manager 120. Once formulated all of the requests are submitted together and are processed in order by the resource manager 120, according to the order in which the requests would have been submitted using the above algorithm.

1.3 EXAMPLE

Figure 4:
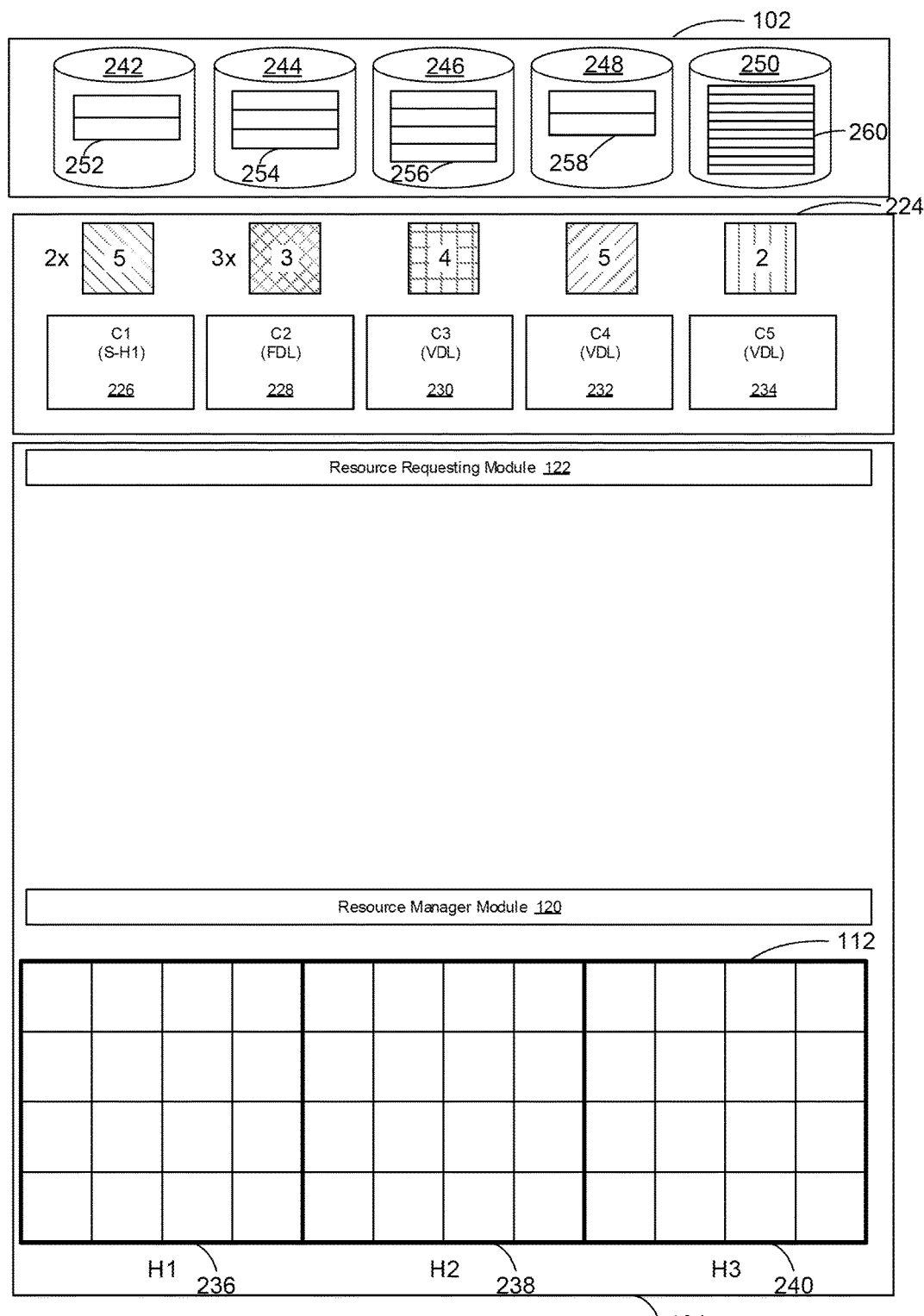
FIG. 4 is the block diagram of FIG. 2 after completion of the first step of the computational resource allocation algorithm.

Referring to FIGS. 4-14, the algorithm of FIG. 3 is applied to the system of FIG. 2 in preparation for executing the data processing graph 224. Referring to FIG. 4, in the first step 370 of the algorithm, the resource requesting module 122 analyzes the components of the data processing graph 224 to determine the resource requirements for each of the components. As a result of the first step 370, the resource requesting module 122 determines that the each instance of the first component 226 requires five units of computational resources, each instance of the second component 228 requires three units of computational resources, each instance of the third component 230 requires four units of computational resources, each instance of the fourth component 232 requires five units of computational resources, and each instance of the fifth component 234 requires two units of computational resources.

Figure 5:
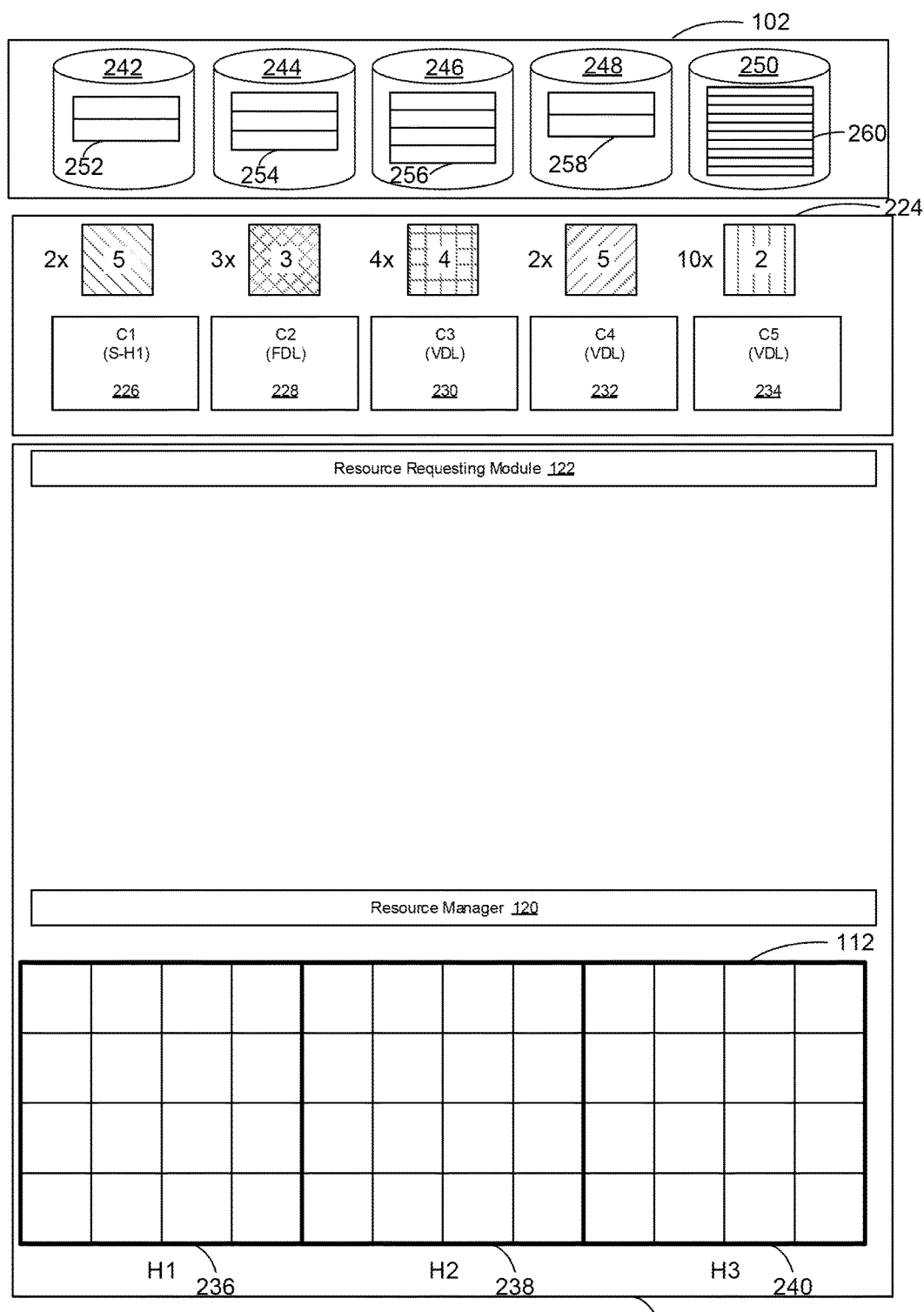
FIG. 5 is the block diagram of FIG. 2 after completion of the second step of the computational resource allocation algorithm.

Referring to FIG. 5, in the second step 366 of the algorithm, the resource requesting module 122 analyzes the datasets associated with each VDL type component to determine a target number of instances for the component. In some examples, the number of data items included in a dataset associated with a component determines the target number of instances for the component. In FIG. 5, the third dataset 246 associated with the third component 230 includes four data items 256. The resource requesting module 122 therefore determines that the target number of instances for the third component 230 is equal to four. The fourth dataset 248 associated with the fourth component 232 includes two data items 258. The resource requesting module 122 therefore determines that the target number of instances for the fourth component 232 is equal to two. The fifth dataset 250 associated with the fourth component 234 includes ten data items 260. The resource requesting module 122 therefore determines that the target number of instances for the fifth component 234 is equal to ten.

Figure 6:
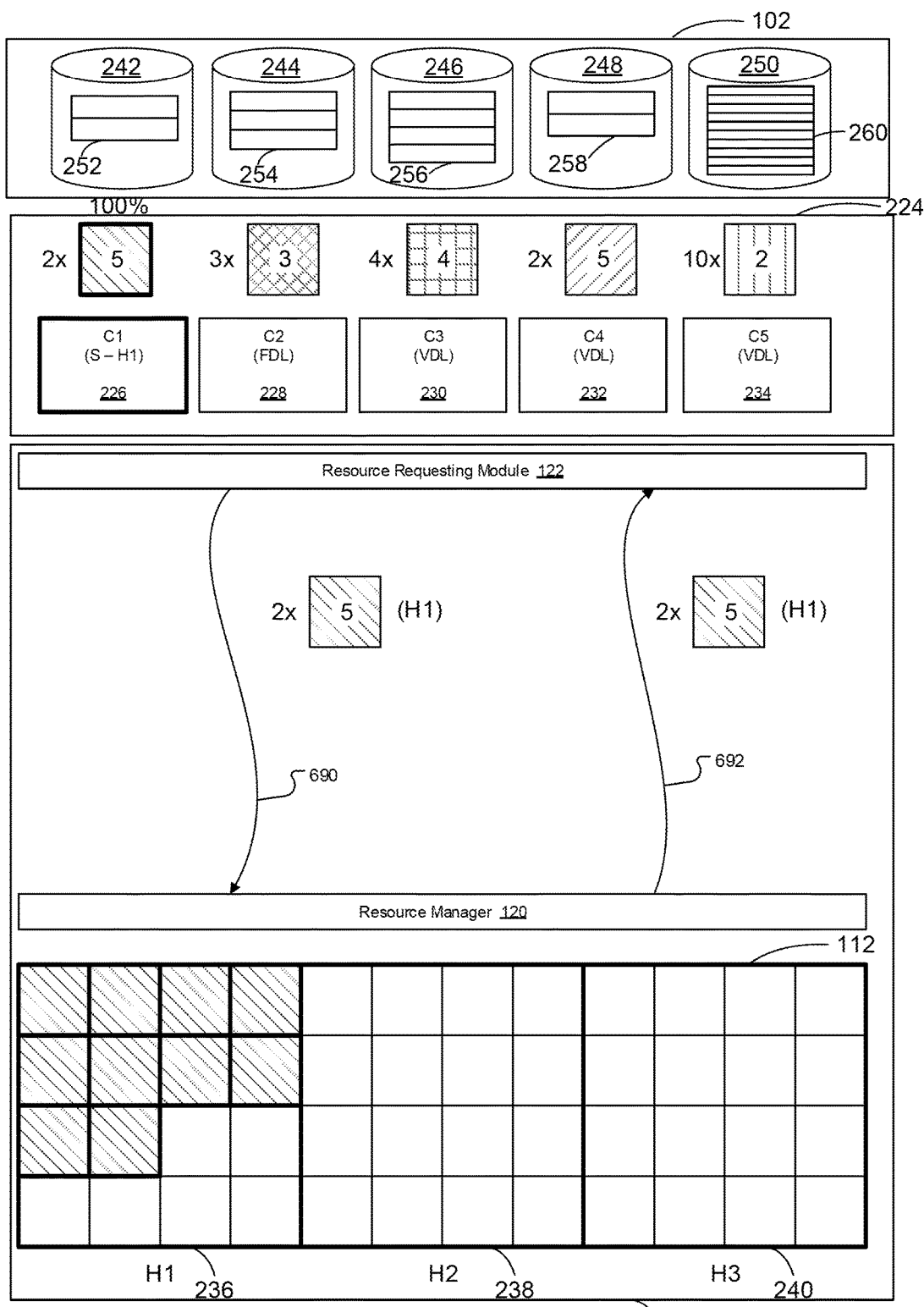
FIG. 6 is the block diagram of FIG. 2 during the third step of the computational resource allocation algorithm.

Referring to FIG. 6, in the third step 374 of the algorithm, the resource requesting module 122 interacts with the resource manager 120 to allocate resources for the first, static layout type component 226. To do so, the resource requesting module 122 sends a request 690 to the resource manager 120 for two containers (i.e., one for each required instance of the component) from the first host 236, each with a size of five computational resource units. In FIG. 6, the resource manager 120 allocates ten computational resource units on the first host 236 and responds with a message 692 indicating that it was able to allocate the requested computational resources and the request 690 is therefore fulfilled. With two containers, each including five computational resource units allocated for the first component 226, the first component 226 is 100% fulfilled, as is required for the data processing graph 224 to execute. The fourth step 376 of the algorithm determines that the request 690 was fulfilled and therefore causes the algorithm to proceed to the fifth step 378 of the algorithm.

Figure 7:
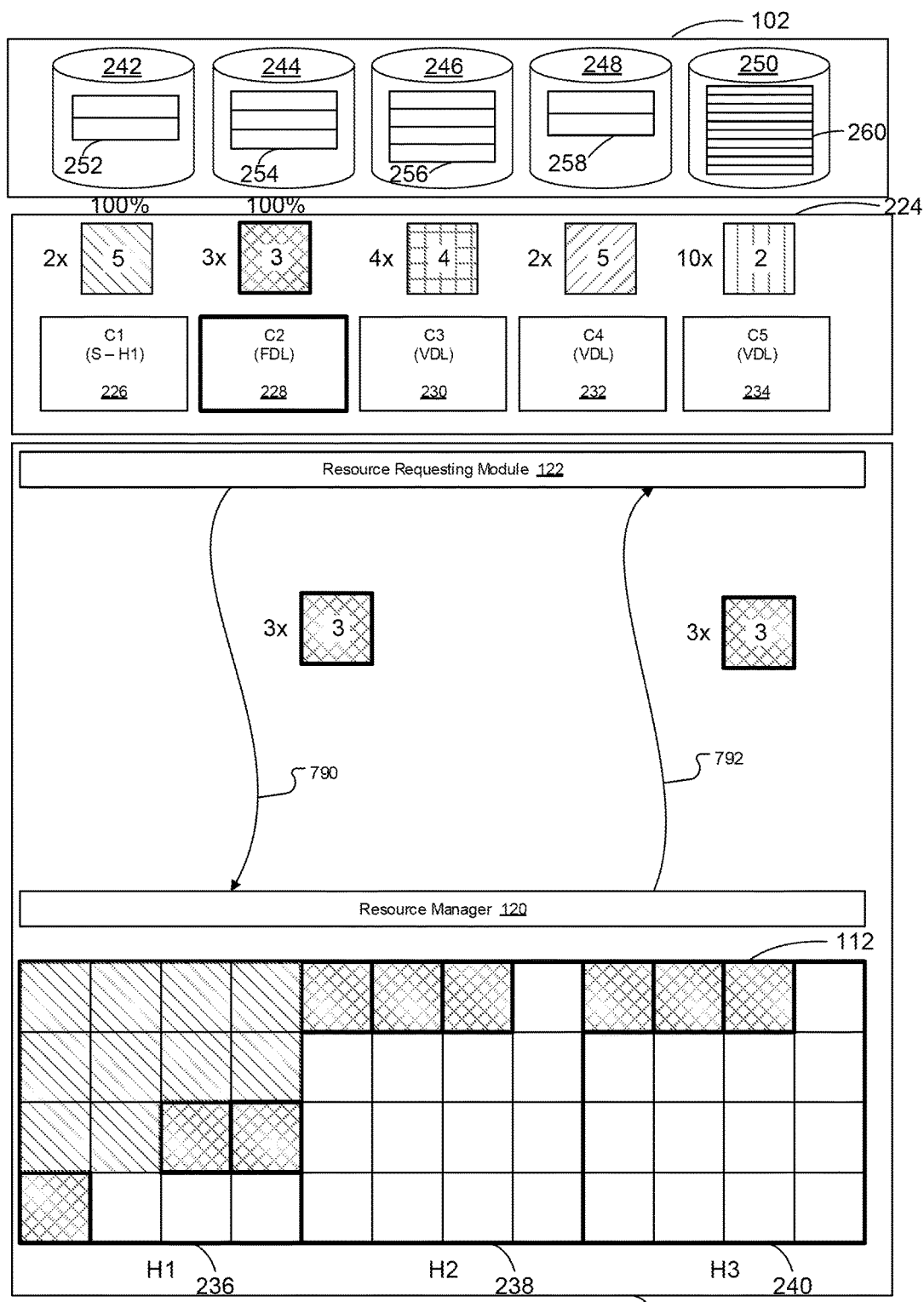
FIG. 7 is the block diagram of FIG. 2 during the fifth step of the computational resource allocation algorithm.

Referring to FIG. 7, in the fifth step 378 of the algorithm, the resource requesting module 122 interacts with the resource manager 120 to allocate resources for the second, FDL type component 228. To do so, the resource requesting module 122 sends a request 790 to the resource manager 120 for three containers (i.e., one for each required instance of the component) from any of the hosts, each with a size of three computational resource units. In FIG. 7, the resource manager 120 allocates three computational resource units on the first host 236, three computational resource units on the second host 238, and three computational resource units on the third host 240. The resource manager 120 then responds with a message 792 indicating that it was able to allocate the requested computational resources and the request 790 is therefore fulfilled. With three containers, each including three computational resource units allocated for the second component 228, the second component 228 is 100% fulfilled, as is required for the data processing graph 224 to execute. The sixth step 380 of the algorithm determines that the request 790 was fulfilled and therefore causes the algorithm to proceed to the seventh step 382 of the algorithm.

Figure 8:
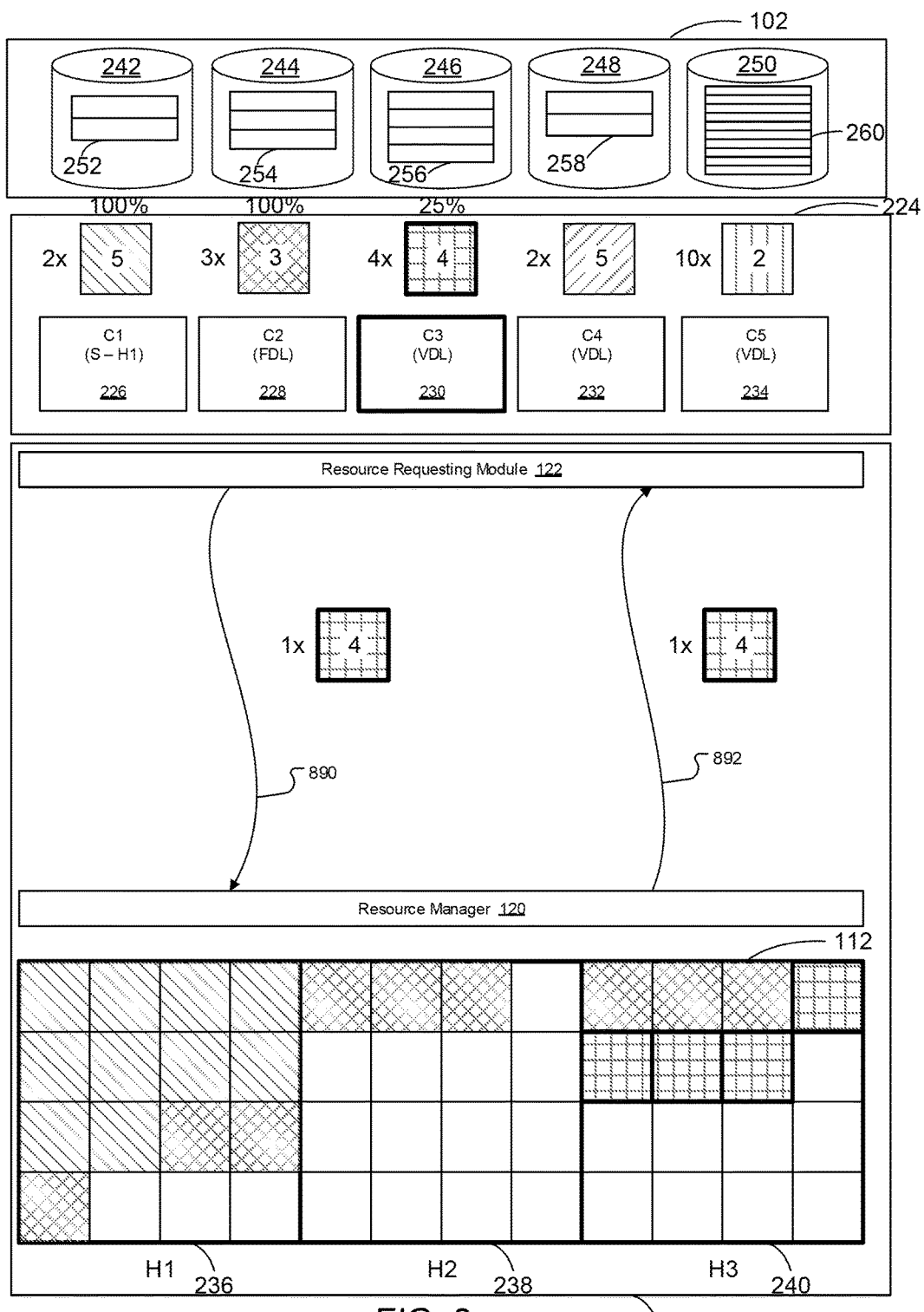
FIG. 8 is the block diagram of FIG. 2 during a first part of the seventh step of the computational resource allocation algorithm.
Figure 9:
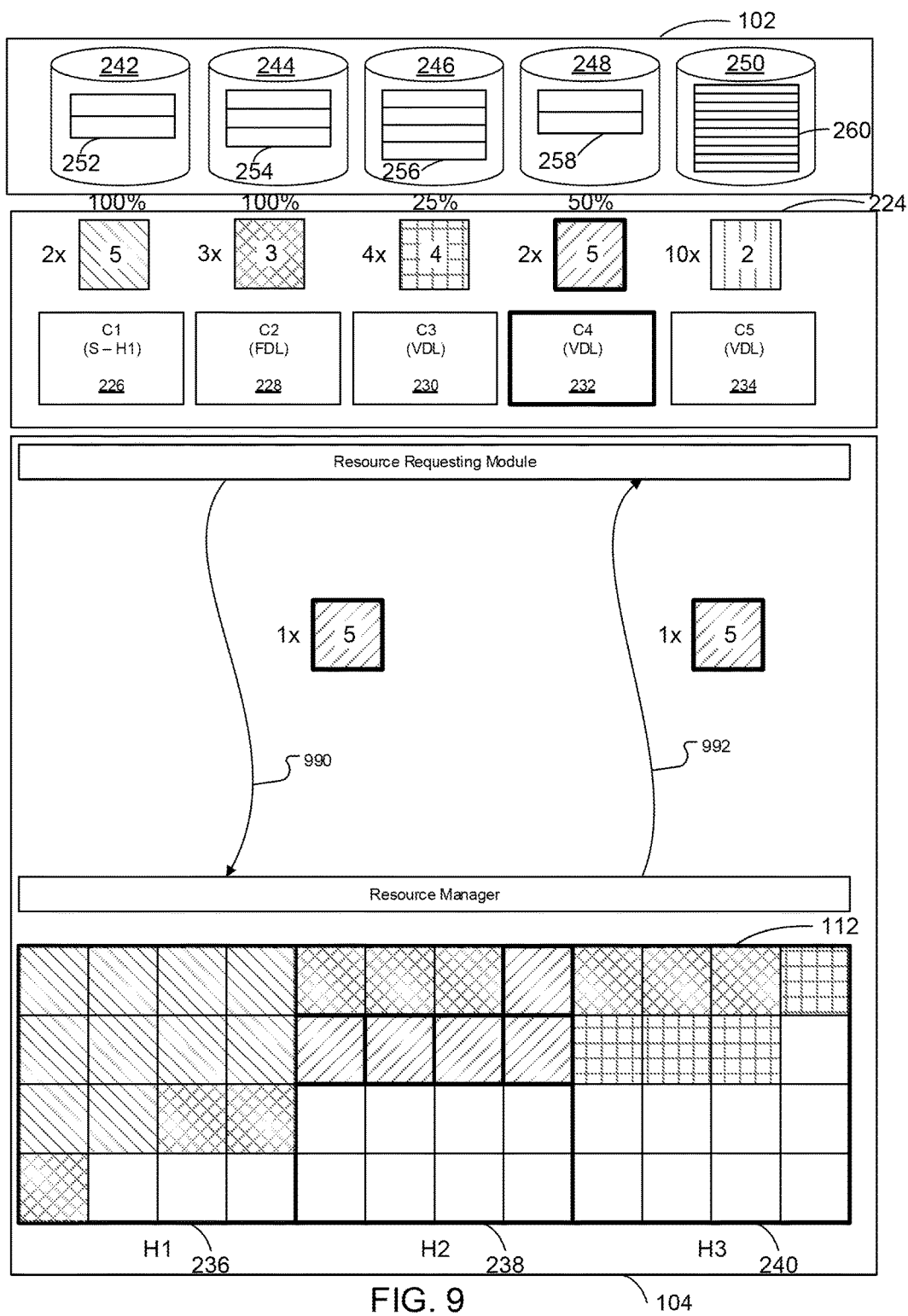
FIG. 9 is the block diagram of FIG. 2 during a second part of the seventh step of the computational resource allocation algorithm.
Figure 10:
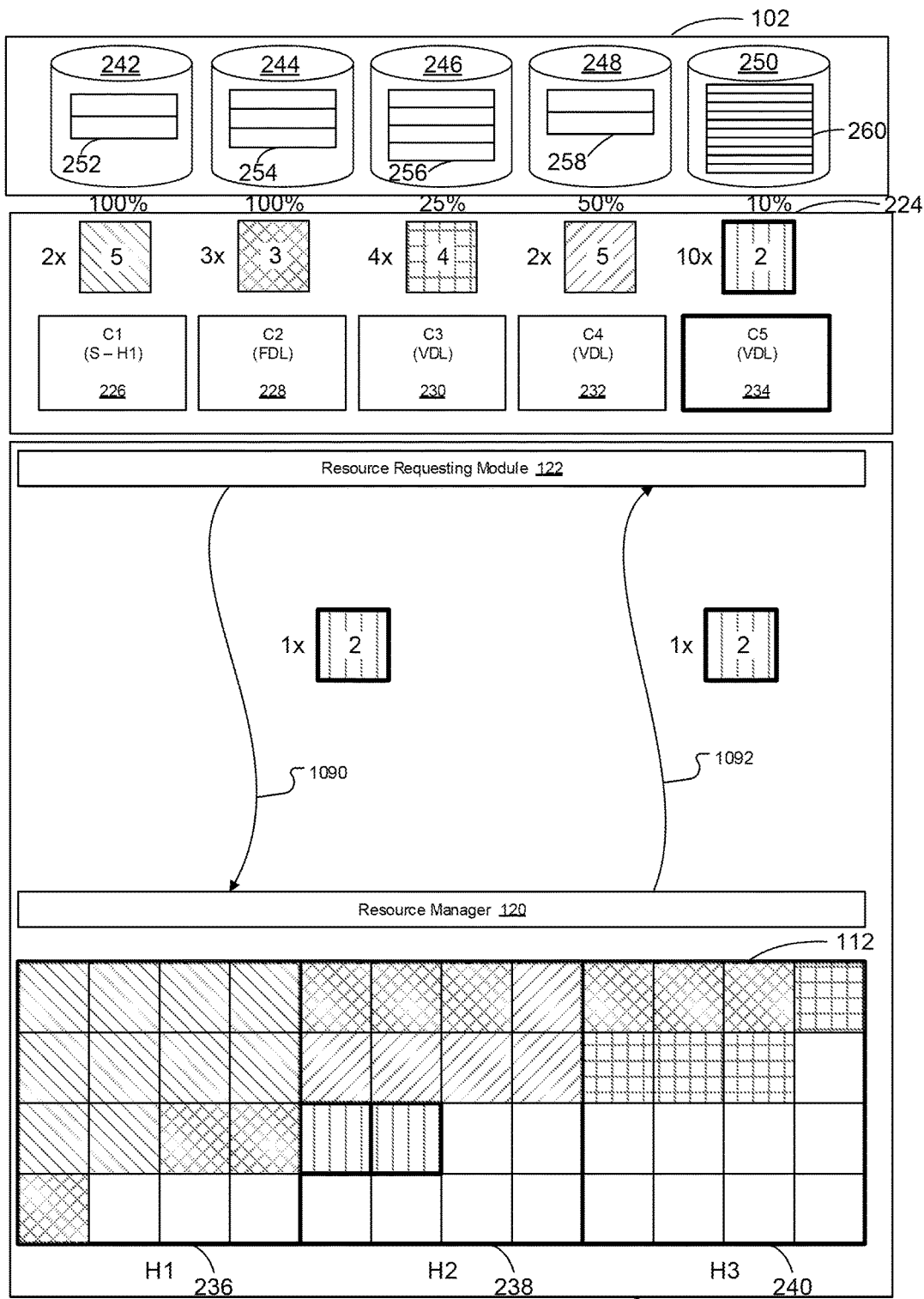
FIG. 10 is the block diagram of FIG. 2 during a third part of the seventh step of the computational resource allocation algorithm.

Referring to FIGS. 8-10, in the seventh step 382 of the algorithm, the resource requesting module 122 interacts with the resource manager 120 to allocate resources for a single instance of each of the third, VDL type component 230, the fourth, VDL type component 232, and the fifth, VDL type component 234.

In FIG. 8, the resource requesting module 122 requests allocation of resources for an instance of the third, VDL type component 230 by sending a request 890 to the resource manager 120 for a single container with a size of four computational resource units. The resource manager 120 allocates four computational resource units on the third host, 240 and then responds with a message 892 indicating that it was able to allocate the requested computational resources and the request 890 is therefore fulfilled. With one container including four computational resource units allocated (out of a target number of four containers) for the third component 230, the third component 230 is 25% fulfilled.

In FIG. 9, the resource requesting module 122 requests allocation of resources for an instance of the fourth, VDL type component 232 by sending a request 990 to the resource manager 120 for a single container with a size of five computational resource units. The resource manager 120 allocates five computational resource units on the second host, 238 and then responds with a message 992 indicating that it was able to allocate the requested computational resources and the request 990 is therefore fulfilled. With one container including five computational resource units allocated (out of a target number of two containers) for the fourth component 232, the fourth component 232 is 50% fulfilled.

In FIG. 10, the resource requesting module 122 requests allocation of resources for an instance of the fifth, VDL type component 234 by sending a request 1090 to the resource manager 120 for a single container with a size of two computational resource units. The resource manager 120 allocates two computational resource units on the second host, 238 and then responds with a message 1092 indicating that it was able to allocate the requested computational resources and the request 1090 is therefore fulfilled. With one container including two computational resource units allocated (out of a target number of ten containers) for the fifth component 234, the fifth component 234 is 10% fulfilled.

The eighth step 384 of the algorithm determines that computational resources were successfully allocated for a single instance of each of the VDL type components and therefore causes the algorithm to proceed to the ninth step 386 of the algorithm.

Upon completion of the seventh step and eighth steps 382, 384 sufficient resources are allocated to the components of the data processing graph 224 to ensure that it can execute on the execution module 104. The ninth and tenth steps 386, 388 of the algorithm are then repeatedly run to fairly distribute the remaining computational resources to the third, fourth, and fifth components 230, 232, 234, as is illustrated in FIGS. 11-14.

Figure 11:
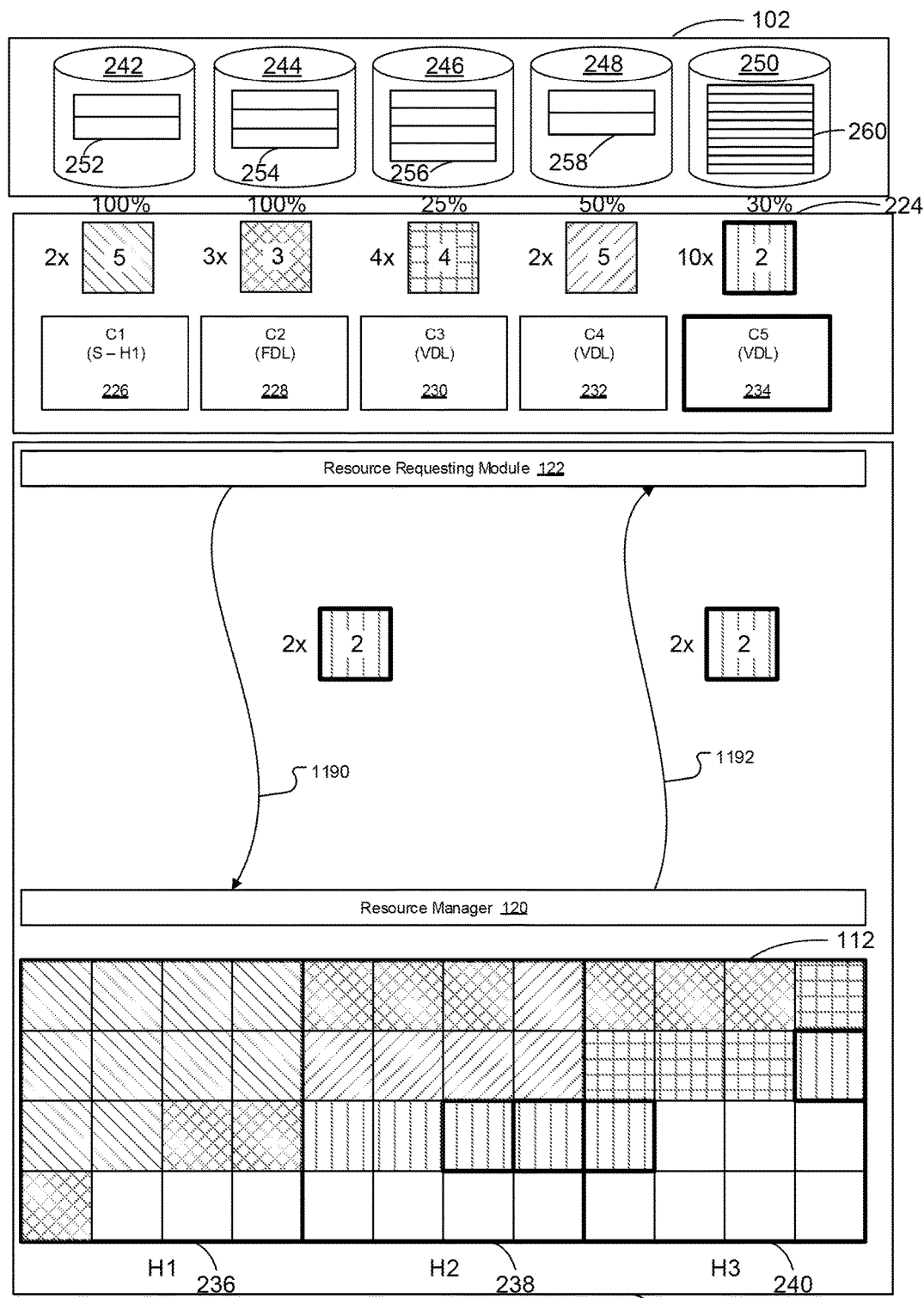
FIG. 11 is the block diagram of FIG. 2 during a first iteration of the ninth step of the computational resource allocation algorithm.

Referring to FIG. 11, in the ninth step 386 of the algorithm, the resource requesting module 122 determines that the fifth component 234 is the least-fulfilled component (at 10% fulfillment ratio) and that the third component 230 is the second least-fulfilled component (at 25% fulfillment ratio). The resource requesting module 122 then determines that the number, N of instances of the fifth component 234 that, if granted, would result in the fifth component 234 being more fulfilled than the third component 230 is:

$$N = \left\lfloor \left(\frac{1}{4} - \frac{1}{10}\right) * (10) + 1 \right\rfloor = 2$$

The resource requesting module 122 then sends a request 1190 to the resource manager 120 for two the containers from any of the hosts, each with a size of two computational resource units. In FIG. 11, the resource manager 120 allocates two computational resource units on the second host 238 and two computational resource units on the third host 240. The resource manager 120 then responds with a message 1192 indicating that it was able to allocate the requested computational resources and the request 1190 is therefore fulfilled. With three containers, each including two computational resource units allocated for the fifth component 234, the fifth component 234 is 30% fulfilled. The tenth step 388 determines that all of the containers requested by the resource manager 120 in the ninth step 386 are fulfilled, and the algorithm therefore loops back to the ninth step 386.

Figure 12:
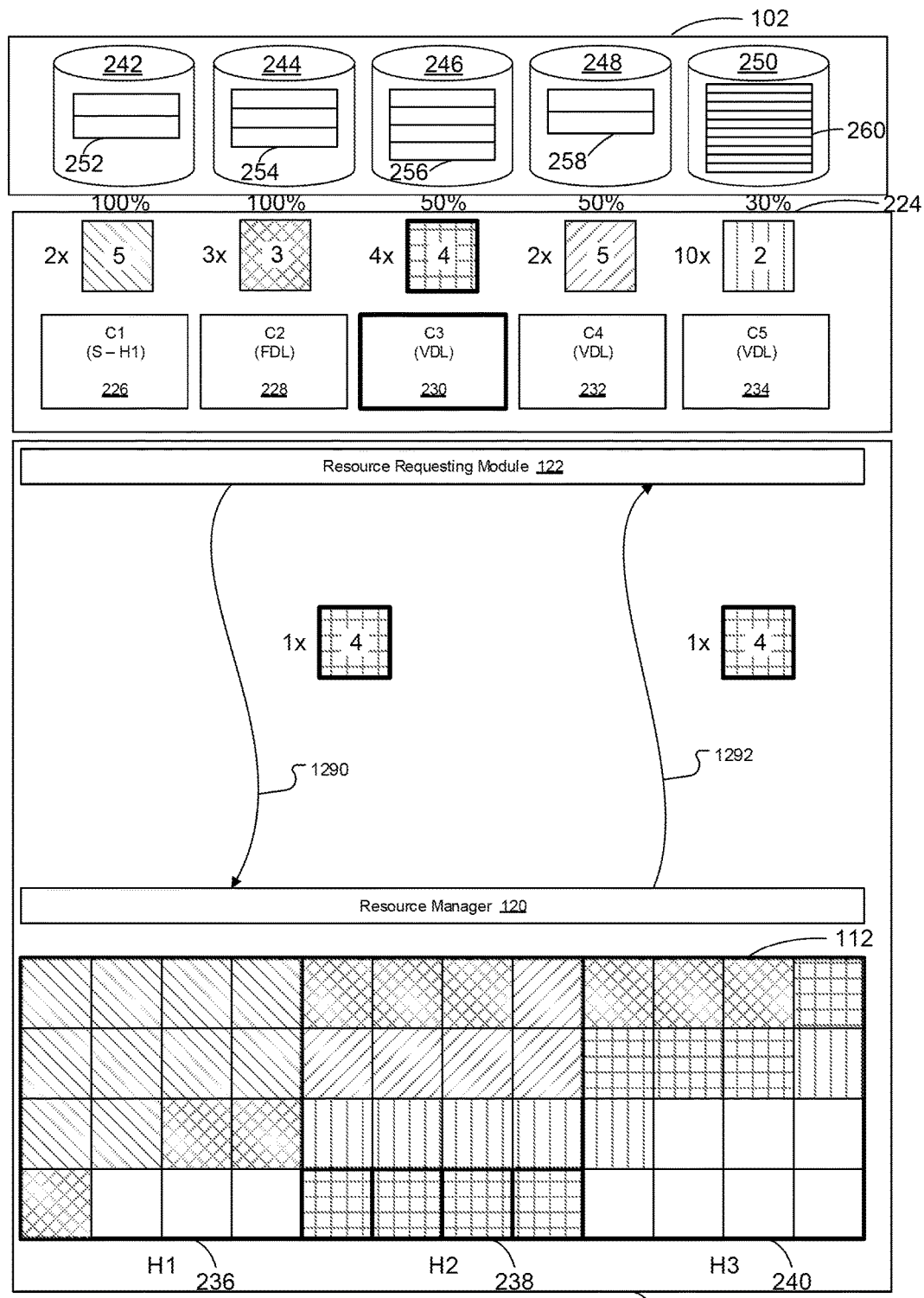
FIG. 12 is the block diagram of FIG. 2 during a second iteration of the ninth step of the computational resource allocation algorithm.

Referring to FIG. 12, in a second iteration of the ninth step 386 of the algorithm, the resource requesting module 122 determines that the third component 230 is the least-fulfilled component (at 25% fulfillment ratio) and that the fifth component 234 is the second least-fulfilled component (at 30% fulfillment ratio). The resource requesting module 122 then determines that the number, N of instances of the third component 230 that, if granted, would result in the third component 230 being more fulfilled than the fifth component 234 is:

$$N = \left\lfloor \left(\frac{3}{10} - \frac{1}{4}\right) * (4) + 1 \right\rfloor = 1$$

The resource requesting module 122 then sends a request 1290 to the resource manager 120 for one container from any of the hosts with a size of four computational resource units. In FIG. 12, the resource manager 120 allocates four computational resource units on the second host 238. The resource manager 120 then responds with a message 1292 indicating that it was able to allocate the requested computational resources and the request 1290 is therefore fulfilled. With a single container including four computational resource units allocated for the third component 230, the third component 230 is 50% fulfilled. The tenth step 388 determines that all of the containers requested by the resource manager 120 in the ninth step 386 are fulfilled, and the algorithm therefore loops back to the ninth step 386.

Figure 13:
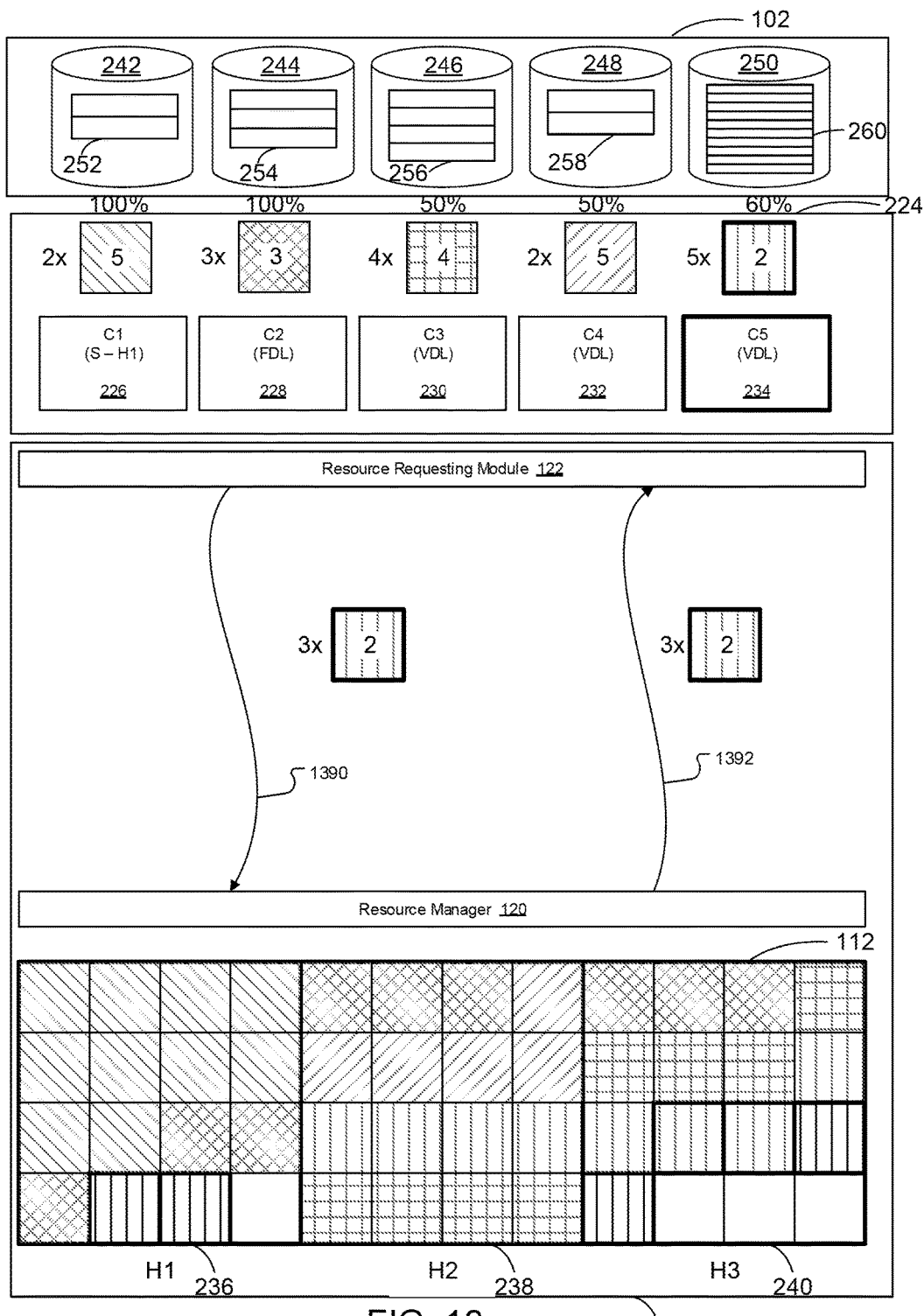
FIG. 13 is the block diagram of FIG. 2 during a third iteration of the ninth step of the computational resource allocation algorithm.

Referring to FIG. 13, in a third iteration of the ninth step 386 of the algorithm, the resource requesting module 122 determines that the fifth component 234 is the least-fulfilled component (at 30% fulfillment ratio) and that the third component 230 (or the fourth component 232) is the second least-fulfilled component (at 50% fulfillment ratio). The resource requesting module 122 then determines that the number, N of instances of the fifth component 234 that, if granted, would result in the fifth component 234 being more fulfilled than the third component 230 is:

$$N = \left\lfloor \left(\frac{2}{4} - \frac{3}{10}\right) * (10) + 1 \right\rfloor = 3$$

The resource requesting module 122 then sends a request 1390 to the resource manager 120 for three containers from any of the hosts, each container with a size of two computational resource units. In FIG. 13, the resource manager 120 allocates two computational resource units on the first host 236, and four computational resource units on the third host 240. The resource manager 120 then responds with a message 1392 indicating that it was able to allocate the requested computational resources and the request 1390 is therefore fulfilled. With a three containers including two computational resource units allocated for the fifth component 234, the fifth component 234 is 60% fulfilled. The tenth step 388 determines that all of the containers requested by the resource manager 120 in the ninth step 386 are fulfilled, and the algorithm therefore loops back to the ninth step 386.

Figure 14:
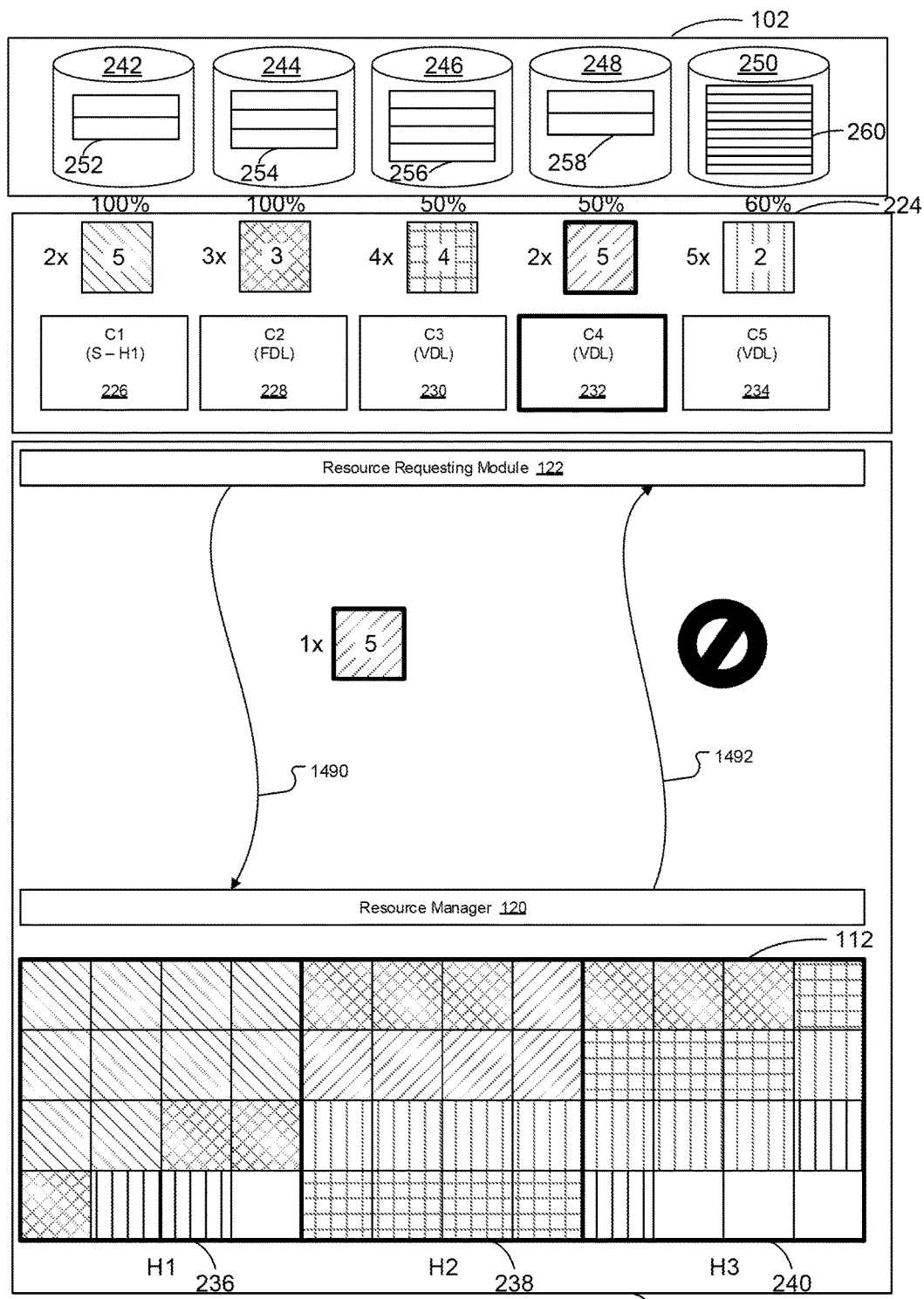
FIG. 14 is the block diagram of FIG. 2 during a fourth iteration of the ninth step of the computational resource allocation algorithm.

Referring to FIG. 14, in a fourth iteration of the ninth step 386 of the algorithm, the resource requesting module 122 determines that the fourth component 232 is the least-fulfilled component (at 50% fulfillment ratio) and that the third component 230 is the second least-fulfilled component (at 50% fulfillment ratio). The resource requesting module 122 then determines that the number, N of instances of the fourth component 232 that, if granted, would result in the fourth component 232 being more fulfilled than the third component 230 is:

$$N = \left\lfloor \left(\frac{2}{4} - \frac{1}{2}\right) * (2) + 1 \right\rfloor = 1$$

The resource requesting module 122 then sends a request 1490 to the resource manager 120 for one container from any of the hosts with a size of five computational resource units. In FIG. 14, the resource manager 120 is unable to allocate five computational resource units on any of the hosts and therefore responds with a message 1492 indicating that it was unable to allocate the requested computational resources. The tenth step 388 determines that all of the containers requested by the resource manager 120 in the ninth step 386 are not fulfilled, and the algorithm is therefore "done" and exits.

It is noted that, in some examples, since components may have different resource requirements, the algorithm may not complete upon the first failed request for resource allocation but may instead attempt to allocate additional resources for the other VDL type components until none of the components is able to allocate any additional computation resources.

In some examples, each component is associated with a different layout, but in other examples, there may be multiple components that share the same layout. In those latter examples, the same techniques described herein can be used by summing resources required by the multiple components and requesting the resulting sum of resources for the multiple components to share.

2 IMPLEMENTATIONS

The computational resource allocation approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., elements of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for requesting, from a computational resource manager, computational resources for executing a program in a computing system, the method including:

storing information specifying target quantities of computational resources associated with respective ones of a plurality of program portions of the program, where each program portion uses computational resources granted by the computational resource manager enabling that program portion to be executed in the computing system; and computing requests for submission to the computational resource manager as a plurality of sets of requests, where each set of requests, except for an initial set of requests, is processed by the computational resource manager only if the previously submitted one or more sets of the plurality of sets of requests were granted by the computational resource manager, the computing including:
   forming the initial set of requests, and
   forming one or more additional sets of requests for processing by the computational resource manager after the initial set of requests,
   wherein at least one set of requests of the additional sets of requests includes a partial request for at least one program portion that is in a least-fulfilled set of one or more program portions,
   wherein each program portion is associated with a respective fulfillment ratio of its quantity of previously requested computational resources divided by its associated target quantity of computational resources,
   wherein a program portion is a member of the least-fulfilled set if its associated fulfillment ratio, over all of the plurality of program portions, is the minimum of the associated fulfillment ratios, and
   wherein the partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

2. The method of claim 1, wherein the partial request requests a quantity of computational resources that is small enough so that, after the partial request is granted, each program portion in the least-fulfilled set will have a fulfillment ratio that is still smaller than a fulfillment ratio of at least one program portion outside of the least-fulfilled set.

3. The method of claim 2, wherein the partial request requests a quantity of computational resources that is large enough so that, after the partial request is granted, each program portion in the least-fulfilled set will have a fulfillment ratio that is at least as large as a fulfillment ratio of at least one program portion outside the least-fulfilled set.

4. The method of claim 1, wherein the partial request requests a quantity of computational resources that is large enough so that, after the partial request is granted, each program portion in the least-fulfilled set will have a fulfillment ratio that is at least as large as a fulfillment ratio of at least one program portion outside the least-fulfilled set.

5. The method of claim 1, wherein the initial set of requests includes a minimum request for each program portion, where each minimum request requests a minimum quantity of computational resources needed to execute the corresponding portion of the program.

6. The method of claim 5, wherein at least one of the program portions is associated with a fixed target quantity of computational resources and at least one of the program portions is associated with a variable target quantity of computational resources, and the minimum request for each program portion associated with a fixed target quantity of computational resources is a full request corresponding to the complete target quantity of computational resources, and the minimum request for each program portion associated with a variable target quantity of computational resources is a partial request corresponding to less than the complete target quantity of computational resources.

7. The method of claim 6, wherein the minimum request for each program portion associated with a variable target quantity of computational resources is a partial request corresponding to a single unit of computational resources, where each variable target quantity of computational resources is defined in terms of a granularity of computational resources that divides the complete target quantity of computational resources into a plurality of units of equal size.

8. The method of claim 1, wherein at least some requests in at least one set of requests correspond to quantities of computational resources of different sizes from each other.

9. The method of claim 1, wherein storing the information specifying target quantities of computational resources associated with respective ones of the plurality of program portions includes, for at least one program portion, determining its associated target quantity of computational resources based at least in part on user input.

10. The method of claim 1, wherein the computational resources are distributed over a plurality of computing nodes.

11. The method of claim 10, wherein at least some of the program portions require that their granted computational resources are obtained from a specific one or more computing nodes of the plurality of computing nodes.

12. The method of claim 10, wherein computational resources associated with each request of each set of requests of the plurality of sets of requests must be obtained from a single computing node of the plurality of computing nodes.

13. The method of claim 1, wherein at least some of the program portions are configured to process data items from one or more data sources and the method further includes determining the target quantities of computational resources for each of the program portions based at least in part on the data items from the one or more data sources.

14. The method of claim 13, wherein determining the target quantities of computational resources for each of the program portions based at least in part on the data items from the one or more data sources includes, for each program portion, adding computational resources associated with a single instance of the program portion to the target quantity of computational resources associated with the program portion for each data item to be processed by the program portion.

15. The method of claim 1, wherein each request, of each set of requests of the plurality of sets of requests, requests computational resources required by a single instance of a particular program portion of the plurality of program portions.

16. The method of claim 1, wherein a first program portion of the plurality of program portions is associated with a plurality of requests from the plurality of sets of requests.

17. The method of claim 1, further including receiving, in response to the initial set of requests, an indication that one or more requests of the initial set of requests was not fulfilled and aborting execution of the program based on the response.

18. Software stored in a non-transitory form on a computer-readable medium, for requesting, from a computational resource manager, computational resources for executing a program in a computing system, the software including instructions for causing a computing system to:
   store information specifying target quantities of computational resources associated with respective ones of a plurality of program portions of the program, where each program portion uses computational resources granted by the computational resource manager enabling that program portion to be executed in the computing system; and compute requests for submission to the computational resource manager as a plurality of sets of requests, where each set of requests, except for an initial set of requests, is processed by the computational resource manager only if the previously submitted one or more sets of the plurality of sets of requests were granted by the computational resource manager, the computing including:
forming the initial set of requests, and
forming one or more additional sets of requests for processing by the computational resource manager after the initial set of requests,
wherein at least one set of requests of the additional sets of requests includes a partial request for at least one program portion that is in a least-fulfilled set of one or more program portions,
wherein each program portion is associated with a respective fulfillment ratio of its quantity of previously requested computational resources divided by its associated target quantity of computational resources,
wherein a program portion is a member of the least-fulfilled set if its associated fulfillment ratio, over all of the plurality of program portions, is the minimum of the associated fulfillment ratios, and
wherein the partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

19. A computing system for requesting, from a computational resource manager, computational resources for executing a program in the computing system, the computing system including:
a data storage system storing information specifying target quantities of computational resources associated with respective ones of a plurality of program portions of the program, where each program portion uses computational resources granted by the computational resource manager enabling that program portion to be executed in the computing system; and
at least one processor configured to compute requests for submission to the computational resource manager as a plurality of sets of requests, where each set of requests, except for an initial set of requests, is processed by the computational resource manager only if the previously submitted one or more sets of the plurality of sets of requests were granted by the computational resource manager, the computing including:
forming the initial set of requests, and
forming one or more additional sets of requests for processing by the computational resource manager after the initial set of requests,
wherein at least one set of requests of the additional sets of requests includes a partial request for at least one program portion that is in a least-fulfilled set of one or more program portions,
wherein each program portion is associated with a respective fulfillment ratio of its quantity of previously requested computational resources divided by its associated target quantity of computational resources,
wherein a program portion is a member of the least-fulfilled set if its associated fulfillment ratio, over all of the plurality of program portions, is the minimum of the associated fulfillment ratios, and
wherein the partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

20. A computing system for requesting, from a computational resource manager, computational resources for executing a program in the computing system, the computing system including:
means for storing information specifying target quantities of computational resources associated with respective ones of a plurality of program portions of the program, where each program portion uses computational resources granted by the computational resource manager enabling that program portion to be executed in the computing system; and
means for computing requests for submission to the computational resource manager as a plurality of sets of requests, where each set of requests, except for an initial set of requests, is processed by the computational resource manager only if the previously submitted one or more sets of the plurality of sets of requests were granted by the computational resource manager, the computing including:
forming the initial set of requests, and
forming one or more additional sets of requests for processing by the computational resource manager after the initial set of requests,
wherein at least one set of requests of the additional sets of requests includes a partial request for at least one program portion that is in a least-fulfilled set of one or more program portions,
wherein each program portion is associated with a respective fulfillment ratio of its quantity of previously requested computational resources divided by its associated target quantity of computational resources,
wherein a program portion is a member of the least-fulfilled set if its associated fulfillment ratio, over all of the plurality of program portions, is the minimum of the associated fulfillment ratios, and
wherein the partial request requests a quantity of computational resources that is small enough so that, after the partial request is granted, each program portion in the least-fulfilled set will have a fulfillment ratio that is greater than its fulfillment ratio had been before the partial request had been granted, and is still smaller than one.

* * * * *